May 7, 1968   W. T. BRADSHAW ET AL   3,381,666
BUILDUP CLEARING MEANS FOR AUTOMATIC POULTRY FEEDER
Filed Nov. 8, 1965

INVENTORS
WILLIAM T. BRADSHAW
JOHN J. SWINNEY
KENNETH W. HAGANS

BY *Newton, Hopkins,*
*Jones & Ormsby* ATTORNEYS 3,381,666
BUILDUP CLEARING MEANS FOR AUTOMATIC
POULTRY FEEDER
William T. Bradshaw, Atlanta, and John J. Swinney and
Kenneth W. Hagans, Canton, Ga., assignors to Bramco
Inc., Canton, Ga., a corporation of Georgia
Filed Nov. 8, 1965, Ser. No. 506,726
7 Claims. (Cl. 119—51.11)

ABSTRACT OF THE DISCLOSURE

A poultry feeder having a hopper and a feed trough with an endless conveyor which is driven in a circular path and cut on and off by a timer in combination with a sensing means which determines whether there has been a buildup of feed in the trough and a time delay switch which reduces the effective cycle of the timer in the event of a buildup.

---

This invention relates to automatic, continuous poultry feeding apparatus, and is more particularly concerned with means for clearing a buildup at the point of conveyor return to the hopper.

Continuous, automatic feeders have been known in the field, and have achieved wide acceptance with poultry raisers. Although, for the most part, the automatic feeders work quite well to distribute a given amount of feed throughout a poultry house, there is frequently some feed left on the conveyor when the conveyor re-enters the hopper. Due to the pressure of feed within the hopper, the feed that is on the returning conveyor cannot enter the hopper; instead, the feed simply builds up at the entrance of the conveyor to the hopper. This is most undesirable because the feed will continue to build up until the feed overflows the trough so that large amounts of feed are wasted. The poultry raiser is concerned with the ratio of feed expended to weight of meat produced, and the wasted feed greatly increases one side of this ratio by increasing the feed expended to lower the profits considerably.

The usual attempt to correct the problem of the build-up of feed is to run the conveyor less time during a given period. This is an obvious solution since the commercial automatic feeders have time clocks through which the feeder can be turned on or off for any given length of time, usually at 15-minute intervals. The use of the time clock to correct the problem of the build-up is, however not as simple as it might first seem because the quantity of feed consumed by poultry varies with the age of the poultry, and somewhat with the particular birds. Therefore, although this may be a possible solution, it is not a practicable solution due to the complexity of the programming and the frequency with which the program must be changed.

Other attempts to correct the problem of the build-up of feed have included means for reducing the pressure of the hopper for allowing the feed to be carried into the hopper. Such arrangements have not met with commercial success because they tend to be excessively complex and expensive.

The apparatus of the present invention overcomes the above mentioned and other difficulties by providing a build-up sensing means to determine when there is a build-up of feed at the conveyor entrance of the hopper. When there is a build-up of feed, the conveyor will be stopped; and, while the conveyor is stopped, the poultry will of course continue to eat feed from the conveyor. When the time clock again starts the conveyor, in accordance with its usual cycle, the conveyor will run in an attempt to pull any remaining feed into the hopper. If, after a given length of time, the buildup has not been removed, the conveyor will again be stopped, and the procedure will be repeated until the buildup is cleared sufficiently that the buildup sensing means will not indicate that there is a buildup.

The present invention provides very simple and inexpensive means for achieving the desired results, and it is readily adaptable both to single trough automatic feeders, and to multiple trough automatic feeders. With this apparatus, the time clock can be set for the greatest amount of feed delivery that will be required, and the buildup clearing means will function to prevent waste of feed, though it will be assured that there will be always sufficient feed to meet the demand of the poultry.

These and other features and advantages of the present invention will become apparent from consideration of the following specification when taken in conjunction with the accompanying drawings in which.

Figure 1:
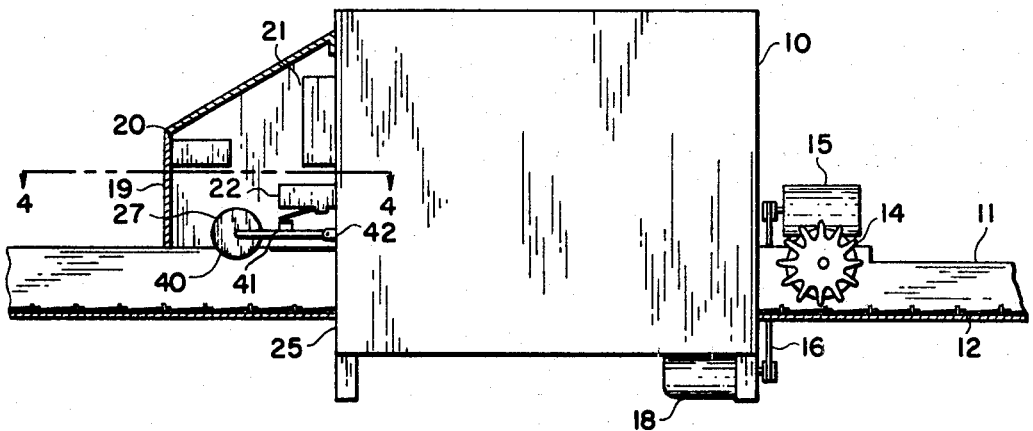
FIG. 1 is a somewhat schematic side elevational view of a continuous automatic feeder having the apparatus of the present invention thereon.

Referring now more particularly to the drawings, and especially to FIG. 1 thereof, it will be seen that there is a hopper 10 having an endless feed trough 11 communicating therewith. The conveyor chain 12 travels in the trough 11, and travels completely through the hopper 10 as is well known in the art. There is a drive sprocket 14 to drive the chain 12, the sprocket 14 being driven from a gear reducer 15, the gear reducer 15 being driven by a belt 16 from an electric motor 18.

At the entrance side of the hopper 10, on the left as viewed in FIG. 1, there is a housing generally designated at 19. The housing 19 contains the conventional timer 20, a box 21 to contain the electrical circuitry of the present invention, and a micro-switch 22 having an actuating arm 24 thereon which is moved by the buildup sensing means 27.

In general, the timer 20 is set to energize the motor 18 to cause the sprocket 14 to drive the chain 12 for a given period of time, perhaps 15 minutes; then, the timer 20 will de-energize the motor 18 so that the chain 12 will be stationary for a period of time, perhaps 45 minutes. As long as the poultry eat enough of the feed from the chain 12, there will be no buildup at the entrance 25 of the hopper 10; however, if the poultry do not eat enough of the feed, the chain 12 will return feed to the hopper 10, and the feed will buildup at the entrance 25. When the buildup reaches the sensing means 27, the sensing means will be rotated and elevated in a clockwise direction as viewed in FIG. 1 to open the switch and turn off the motor 18.

At this point, it should be understood that, although the chain 12 moves from left to right as viewed in FIG. 1, the buildup will move from right to left as viewed in FIG. 1. This should be readily understood when it is considered that excess feed will be carried by the chain 12 to the entrance 25 of the hopper 10 and the feed will be left there while the chain 12 continues into the hopper 10. As more excess feed approaches the hopper 10, the feed on the chain will be deposited at the edge of the existing pile of feed. It will thus be seen that the feed is gradually piled up beginning at the entrance of the hopper 10, and moving in a direction opposite to the direction of travel of the chain 12. It will thus be understood that the sensing means 27 must be able to respond to a buildup moving from the hopper 10, and, although the sensing means is here shown as a device that rotates to operate the switch, it will be readily understood that linear movement would be equally as desirable. The real criterion is that the sensing means must move to operate the switch means.

Figure 2:
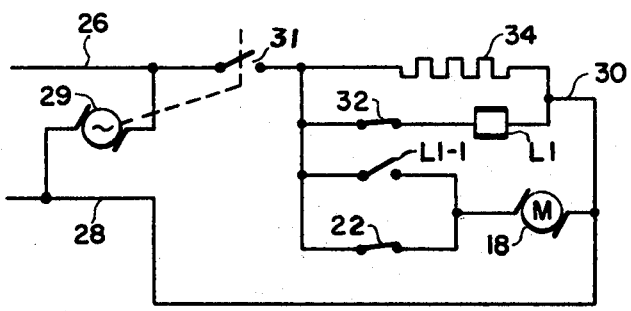
FIG. 2 is a schematic circuit diagram showing the control circuit of the present invention.

A better understanding of the operation of the apparatus can be had by referring to FIG. 2 of the drawings which shows the control circuit therefor. The wires 26 and 28 will be connected to opposite sides of a conventional voltage source, and it will be seen that the motor 29 of the timer 20 is connected in parallel across the line wires 26 and 28. The line wire 28 is connected directly to the motor 18; and, the opposite side of the motor 18 is connected through a pair of parallel connected switches to the line wire 26 to be in series with the switch 31, the switch 31 being the switch controlled by the timer 20.

One of the parallel switches is the microswitch 22, which is a normally closed switch, and the other switch, designated L1–1, is a normally open relay contact.

It will thus be seen that, when the timer 20 indicates that the motor 18 should be de-energized, the motor will always be de-energized. When the timer 20 indicates that the motor 18 should be energized, it will be energized only if at least one of the 22 and L1–1 is closed. Since the micro-switch 22 is a normally closed switch, the switch 22 will be closed except when there is a build-up in the trough 11 that will rotate and elevate the sensing means 27 to open the switch 22 to de-energize the motor 18.

The relay to control the switch L1–1 is relay L1, one side of which is connected to the line 26 through the normally closed switch 32; and, the other side of the relay L1 is connected to the line 28 through the wire 30. There is a heating element 34 connected across the lines 26 and 28; and, the switch 32 has a contact that is a bi-metallic element, the bi-metallic element causing the switch to be closed when cool, and causing the switch to be opened when the bi-metallic element is heated. The heating element 34 is disposed adjacent to the switch 32 so that, when the heating element 34 is energized, the switch 32 will be opened after a predetermined time delay during which the heating element 34 raises the temperature of the switch 32 sufficiently to open the switch.

It will now be seen that, assuming the switch 31 of the timer 20 is closed, current will flow from the line 26, through the heating element 34, and to the heater 34. Since the relay L1 will be energized, the contact L1–1 will be closed; therefore, the motor 18 will be energized through both contact L1–1 and the switch 22, assuming there is no build-up in the trough 11.

After a predetermined time during which the heating element 34 will raise the temperature of the switch 32 sufficiently for the bi-metallic element to warp, the switch 32 will be opened to de-energize the relay L1, the heating element 34 remaining energized to keep the switch 32 open. At this point, the motor 18 will continue to be energized through the microswitch 22.

Now, when there is a build-up in the trough 11, which will move the sensing means 27 to open the switch 22, the motor 18 will be de-energized because the contact L1–1 is held open due to the continued heating of the switch 32 which prevents the relay L1 from being energized to close its contact L1–1. This condition will remain as long as the timer switch 31 is closed.

When, according to the setting of the timer 20, the switch 31 is opened, the heater 34 will be deenergized, which will allow the switch 32 to cool, and to close. Then, when the switch 31 is again closed, the relay L1 will be energized through the switch 32 to close contact L1–1 and energize the motor 18, even though the switch 22 is still open. However, the motor 18 will be energized only as long as it takes the heater 34 to re-heat the switch 32 to cause the switch to open. At this time, if the build-up is still present, and the switch 22 is still open, the motor 18 will be de-energized. If, on the other hand, the build-up is cleared by the brief running of the chain 12, the switch 22 will be closed, and the motor 18 will continue to be energized through the switch 22 after the contact L1–1 is opened.

It will be understood that, while the motor 18 is not energized and the chain 12 is stationary, the poultry will continue to eat feed from the trough 11; then, when the chain again moves, the chain, which will now be empty, will carry the feed from the build-up into the hopper 10, since the chain can now carry a certain amount of feed positively and can overcome the pressure within the hopper 10. If the chain 12 is not sufficiently empty, the brief running time will not clear the build-up, the switch 22 will remain open, and the conveyor will stop until the timer switch 31 again opens and closes on the next cycle.

Although many different designs for the sensing means 27 may be utilized, one particular design is shown in the drawings and includes a roller 40 carried by a pair of arms 41. The arms 41 are pivotally connected at 42 to the hopper 10 or to other convenient support means. The roller 40 is preferably substantially the same width as the trough 11, being dimensioned so that it will cover the width of the trough 11, but will move easily within the trough 11.

Figure 4:
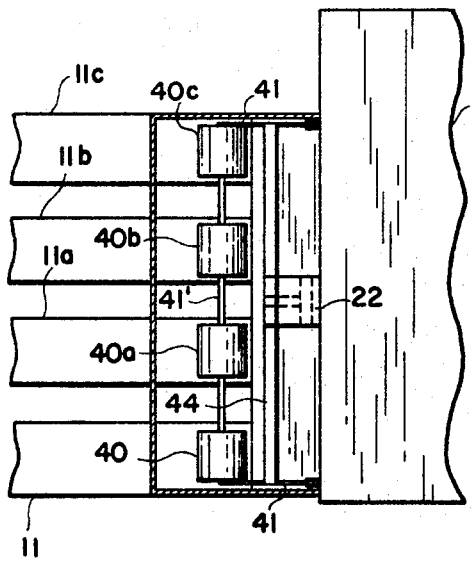
FIG. 4 is a partial cross-sectional view taken substantially along the line 4—4 of FIG 1.
Figure 3:
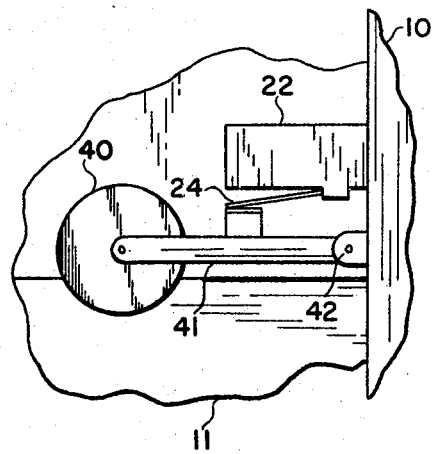
FIG. 3 is an enlarged side elevational view of the buildup sensing means.

Referring to FIG. 4 of the drawings, it will be seen that the device is shown for use with a multiple trough hopper, including troughs 11, 11a, 11b and 11c; and, there are sensing means, or rollers, 40, 40a, 40b and 40c in the respective troughs. There is one arm 41 adjacent the roller 40, an axle 41' extending through all the rollers, and the other arm 41 adjacent the roller 40c, the arms 41 supporting the axle 41'.

Extending between the arms 41, there is a strap 44, the strap 44 being arranged to engage the actuating arm 24 of the switch 22. It will thus be seen that, when there is a build-up in any one of the troughs 11, 11a, 11b, and 11c, the axle 41' will be raised, the strap 44 will operate the switch 22, and the conveyor will stop.

The form and placement of the sensing means 27 should be such that it will not be engaged by the moving chain 12, or by the usual amount of feed carried by the chain 12. The only thing that should engage the sensing means 27 is an abnormal amount of builtup feed.

Although particular electric circuitry and particular apparatus has been presented herein, it will be understood that the invention is not limited to the particular embodiment shown. The important feature is to have some sensing means, such as the means 27, to determine when there is a buildup in the trough 11. Information should be sent from the sensing means to the conveyor drive means to stop the conveyor immediately. When the timer indicates that the conveyor should be stopped, then restarted, the conveyor should run for a predetermined length of time in an effort to clear the buildup; then, the over-ride should be opened to allow the sensing means to control the drive means for the conveyor.

It will thus be seen that many forms of time delay devices can be used, such as additional timers, pneumatic time delay devices, and other well-known apparatus. It will therefore be seen that the particular embodiment of the invention here presented is by way of illustration only, and is meant to be in no way restrictive; therefore, numerous changes and modifications may be made, and the full use of equivalents resorted to, without departing from the spirit or scope of the invention as defined by the appended claims.

What is claimed as invention is:

1. In a continuous poultry feeder having a hopper, an endless feed trough communicating with said hopper and having an entrance portion on one side of the hopper and an exit portion on the other side of the hopper, an endless chain within said feed trough for carrying feed through said trough, and from said hopper, drive means for said chain, a timer, and a timer switch, said timer being adapted to close said timer switch periodically to actuate said drive means, the combination therewith of sensing means adjacent to said entrance portion on said one side of said hopper for sensing a buildup of feed in said trough, said sensing means being adapted to stop said drive means independently of said timer.

2. The apparatus claimed in claim 1 and having means for operating said drive means for a predetermined length of time independently of said sensing means.

3. The apparatus claimed in claim 1 and having timing means operable when said timer first actuates said driving means, said timing means being adapted to actuate said drive means independently of said sensing means.

4. The apparatus as claimed in claim 1 and further having a first switch operated by said sensing means, a relay contact connected in parallel with said first switch, a relay for closing said relay contact, a second switch through which said relay is energized, said second switch being normally closed, time delay means for opening said second switch a predetermined time after said timer switch is closed, the parallel connection of said first switch and said second switch being in series with said drive means.

5. The method of clearing a buildup of feed in an automatic poultry feeder having a feed trough, a feed chain within the feed trough, and a timer to operate the feed chain periodically, said method including the steps of sensing a buildup, stopping the feed chain for a certain and prescribed length of time in response to the detection of said buildup, and then operating the feed chain in response to said timer.

6. The method as claimed in claim 5, said certain length of time being the duration of time that the timer attempts to operate the feed chain, and further including the step of continuing not to operate the feed chain while the timer does not operate the feed chain, allowing the timer to operate the feed chain for a predetermined length of time when the timer attempts to operate the feed chain, stopping the feed chain after a predetermined length of time when the buildup remains, and continuing to operate the feed chain when the buildup is cleared.

7. The method of clearing a buildup of feed in an automatic poultry feeder of the type having a feed trough with an endless chain and a source of feed, the steps of cyclically driving said chain for prescribed lengths of time, stopping said chain for prescribed lengths of time between each driving operation of the chain, detecting a buildup of feed in a portion of the trough and in response thereto altering the driving operation of the chain to reduce the lengths of time that the chain is operated during the period in which the buildup exists.

References Cited
UNITED STATES PATENTS

| | | | |
|---|---|---|---|
| 2,926,629 | 3/1960 | Hazen | 119—52 |
| 3,123,049 | 3/1964 | Cordis | 119—52 |
| 3,124,104 | 3/1964 | Carpenter | 119—51.12 |
| 3,225,742 | 12/1965 | Hagans | 119—51.11 |

HUGH R. CHAMBLEE, *Primary Examiner.*